United States Patent [19]

Inagaki et al.

[11] Patent Number: 5,253,174
[45] Date of Patent: Oct. 12, 1993

[54] ACTIVE SUSPENSION WITH VARIABLE ROLL RIGIDITY DISTRIBUTION RATIO

[75] Inventors: Shoji Inagaki, Susono; Kouichi Kokubo, Nagoya, both of Japan

[73] Assignees: Toyota Jidosha Kabushiki Kaisha; Aisin Seiko Kabushiki Kaisha, both of Aichi, Japan

[21] Appl. No.: 804,755

[22] Filed: Dec. 11, 1991

[30] Foreign Application Priority Data

Dec. 27, 1990 [JP] Japan ................................. 2-414873

[51] Int. Cl.⁵ .......................................... B60G 17/015
[52] U.S. Cl. .............................. 364/424.05; 250/707; 250/772
[58] Field of Search .................. 364/424.05; 280/703, 280/707, 840, 772

[56] References Cited

U.S. PATENT DOCUMENTS

| | | | |
|---|---|---|---|
| 4,761,022 | 8/1988 | Ohashi et al. | 280/703 |
| 4,921,060 | 5/1990 | Imaseki et al. | 280/707 |
| 4,937,748 | 6/1990 | Yonekawa et al. | 280/707 |
| 4,958,850 | 9/1990 | Buma et al. | 280/840 |
| 4,961,595 | 10/1990 | Fukushima et al. | 280/707 |
| 4,971,353 | 11/1990 | Buma et al. | 280/707 |
| 4,973,080 | 11/1990 | Ikemoto et al. | 280/707 |
| 5,013,062 | 5/1991 | Yonekawa et al. | 280/707 |
| 5,042,834 | 8/1991 | Yonekawa et al. | 280/707 |
| 5,043,893 | 8/1991 | Aburaya et al. | 280/707 |
| 5,069,475 | 12/1991 | Yonekawa et al. | 280/707 |
| 5,071,158 | 12/1991 | Yonekawa et al. | 280/707 |
| 5,104,143 | 4/1992 | Yonekawa | 280/707 |

FOREIGN PATENT DOCUMENTS

| | | |
|---|---|---|
| 0246655 | 11/1987 | European Pat. Off. . |
| 0285153 | 10/1988 | European Pat. Off. . |
| 0310094 | 4/1989 | European Pat. Off. . |
| 61-81212 | 4/1986 | Japan . |
| 61-193907 | 8/1986 | Japan . |
| 62-295714 | 12/1987 | Japan . |

OTHER PUBLICATIONS

Patent Abstracts of Japan, vol. 14, No. 132, Mar. 13, 1990 & JP-A-02 003 511.
Patent Abstracts of Japan, vol. 14, No. 196, 1990 & JP-A-02 038 122.
Patent Abstracts of Japan, vol. 13, No. 305, 1989 & JP-A-01 095 927.
Patent Abstracts of Japan, vol. 12, No. 400, 1988 & JP-A-63 145 114.
Patent Abstracts of Japan, vol. 13, No. 163, 1989 & JP-A-64-001 613.
Patent Abstracts of Japan, vol. 15, No. 354, 1991 & JP-A-03 139 409.

Primary Examiner—Gary Chin
Attorney, Agent, or Firm—Oliff & Berridge

[57] ABSTRACT

In order to improve both the stability of the vehicle during a normal turning such as a lane change and the manoeuvrability of the vehicle during a high transverse acceleration turning, in an active suspension having an actuator adapted to increase or decrease vehicle height at the corresponding portion so that the rolling of the vehicle body is suppressed by a control of the actuator carried out in response to transverse acceleration of the vehicle body, the roll rigidity distribution ratio is shifted toward rear vehicle wheels according to increase of the loads on the vehicle wheels at the outside of the turning.

5 Claims, 8 Drawing Sheets

ACTIVE SUSPENSION WITH VARIABLE ROLL RIGIDITY DISTRIBUTION RATIO

BACKGROUND OF THE INVENTION

1. Field of the Invention

The present invention relates to a suspension of a vehicle such as an automobile, and more particularly to a control of an active suspension in relation to a turning of the vehicle.

2. Description of the Prior Art

As a type of active suspensions of vehicles such as automobiles there is known, as shown in, for example, Japanese Patent Laid-open Publication 61-193907, a hydraulic active suspension comprising an actuator provided to correspond to each vehicle wheel so as to change vehicle height at a corresponding position according to supply or exhaust of a working fluid to or from a working fluid chamber thereof, a working fluid supply and exhaust means for supplying or exhausting the working fluid to or from said working fluid chamber, a transverse acceleration detection means for detecting transverse acceleration of a vehicle body, a means for detecting load imposed on a vehicle wheel at an outside of a turn, and a control means for controlling said working fluid supply and exhaust means in accordance with said transverse acceleration.

In such an active suspension, an attitude change of the vehicle body due to a transverse acceleration during a turn is desirably controlled, as the working fluid supply and exhaust means is controlled according to the transverse acceleration of the vehicle body and vehicle heights at respective vehicle wheels are changed so as to suppress the rolling of the vehicle body.

As is well known in the art, the steering performance of a vehicle, such as an automobile, is determined according to the distribution of the roll rigidity between front and rear vehicle wheels. The distribution of the roll rigidity is generally fixed.

Figure 9:
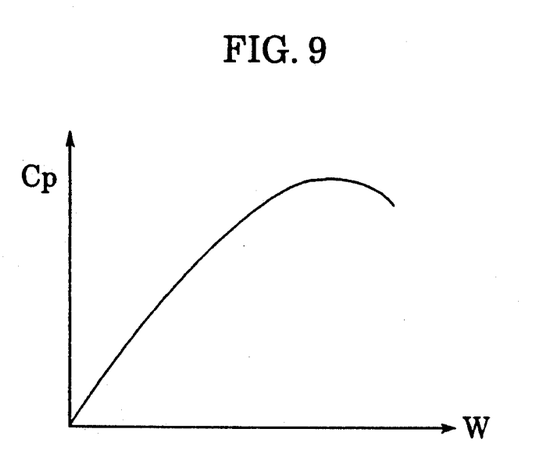
FIG. 9 is a graph showing the relation between tire load W and cornering power Cp.

The relation between a load on a vehicle wheel, i.e. a tire load (W), and a cornering power (Cp) shows a saturating characteristic as shown in FIG. 9. Therefore, in a relatively high tire load region, the cornering power does not correspondingly increase when the tire load further increases. Therefore, during a high transverse acceleration turn, the cornering power in a front vehicle wheel at the outside of the turn first saturates so that the relative magnitude of the cornering power in the front vehicle wheel decreases as compared to that in a rear vehicle wheel, whereby the vehicle shifts towards the outside of the turn, with the steering performance shifting toward the understeer.

Figure 10:
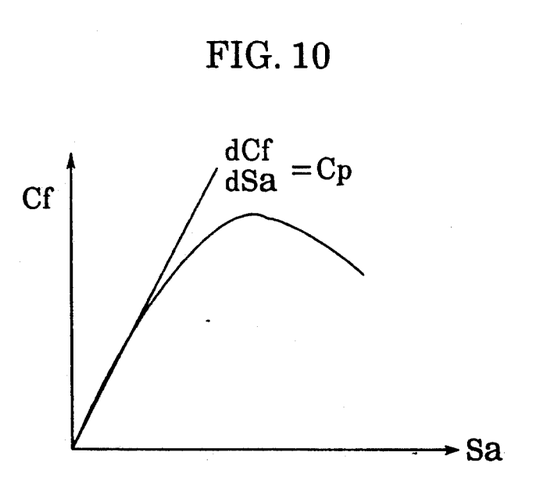
FIG. 10 is a graph showing the relation between tire slip angle Sa and cornering force Cf.

When the vehicle shifts toward the outside of the turn, the slip angle of the front vehicle wheel increases. Since the relation between the cornering force (Cf) and the slip angle (Sa) has also a saturating characteristic as shown in FIG. 10, the vehicle shifts further toward the outside of the turn, resulting in a further shifting of the steering performance toward the understeer.

Therefore, when the distribution of the roll rigidity is shifted more toward the front vehicle wheels by giving predominance to the stability of the vehicle in a lane change or the like, the steering performance shifts more toward the understeer during a high transverse acceleration turn, deteriorating manoeuvrability of the vehicle. In contrast, when the distribution of the roll rigidity is more shifted toward the rear vehicle wheels by giving predominance to the steering performance during a high transverse acceleration turning, the steering performance during a low transverse acceleration turn including a lane change shifts toward the oversteering, thereby deteriorating stability of the vehicle.

The above-mentioned problem exists in both the vehicles equipped with the active suspensions and the vehicles equipped with the conventional passive suspensions. This problem is not solved by the active suspension described in the above-mentioned publication.

SUMMARY OF THE INVENTION

In view of the above-mentioned problem in the conventional hydraulic suspension, it is the object of the present invention to provide an improved active suspension in which the stability of the vehicle during a normal turn, including a lane change, and the manoeuvrability of the vehicle during a high transverse acceleration turn are both improved.

According to the present invention, the above-mentioned object is accomplished by an active suspension comprising actuators provided to correspond to each vehicle wheel so as to change vehicle height at a corresponding position, a transverse acceleration detection means for detecting transverse acceleration of a vehicle body, a means for detecting load imposed on a vehicle wheel at an outside of a turn, and a control means for controlling said actuator in accordance with said transverse acceleration, wherein said control means is adapted to distribute roll rigidity so as to provide a greater share thereof on a rear vehicle wheel as the loads imposed on the vehicle wheels at the outside of the turning is greater.

According to the above-mentioned construction, the distribution of the roll rigidity is controlled to be shifted more toward the rear vehicle wheels as the load on the vehicle wheels at the outside of a turn is greater, or conversely, is shifted more toward the front vehicle wheels as the load on the vehicle wheels at the outside of a turn is less. As the distribution of the roll rigidity is controlled to be shifted toward the rear vehicle wheels during a high transverse acceleration turn of the vehicle, the steering performance is shifted toward the oversteer, whereby a good manoeuvrability of the vehicle is ensured. As the distribution of the roll rigidity is shifted toward the front vehicle wheels during a normal turning including a lane change, the steering performance is shifted toward the understeer, whereby a good stability of the vehicle is ensured.

For further details, said control means may comprise a first factor multiplier for a front vehicle wheel and a second factor multiplier for a rear vehicle wheel, said first and second factor multipliers calculating loads imposed on the front and rear vehicle wheels from the transverse acceleration, respectively, and a function generating system for generating multiplying factors in said first and second factor multipliers based upon at least one of the vehicle wheel loads calculated by said first and second factor multipliers, wherein said function generating system decreases the multiplying factor for the front vehicle wheel relative to the multiplying factor for the rear vehicle wheel as the absolute value of the vehicle wheel load calculated by at least one of said first and second factor multipliers increases.

Further, said function generating system may comprise a means for restricting said first and second multiplying factors not to be greater than maximum values predetermined therefor and not to be less than minimum values predetermined therefor.

Said maximum and minimum values for said first and second multiplying factors may desirably be increased when vehicle speed increases.

The actuator may conveniently be a hydraulic actuator having a working fluid chamber, and said control means may comprise a hydraulic circuit means for supplying and exhausting a working fluid to and from said working fluid chamber, and an electric control means for controlling flow of a working fluid in said hydraulic circuit means.

BRIEF DESCRIPTION OF THE DRAWINGS

In the accompanying drawings.

DESCRIPTION OF THE PREFERRED EMBODIMENT

In the following the present invention will be described in more detail with respect to an embodiment with reference to the accompanying drawing.

Figure 1:
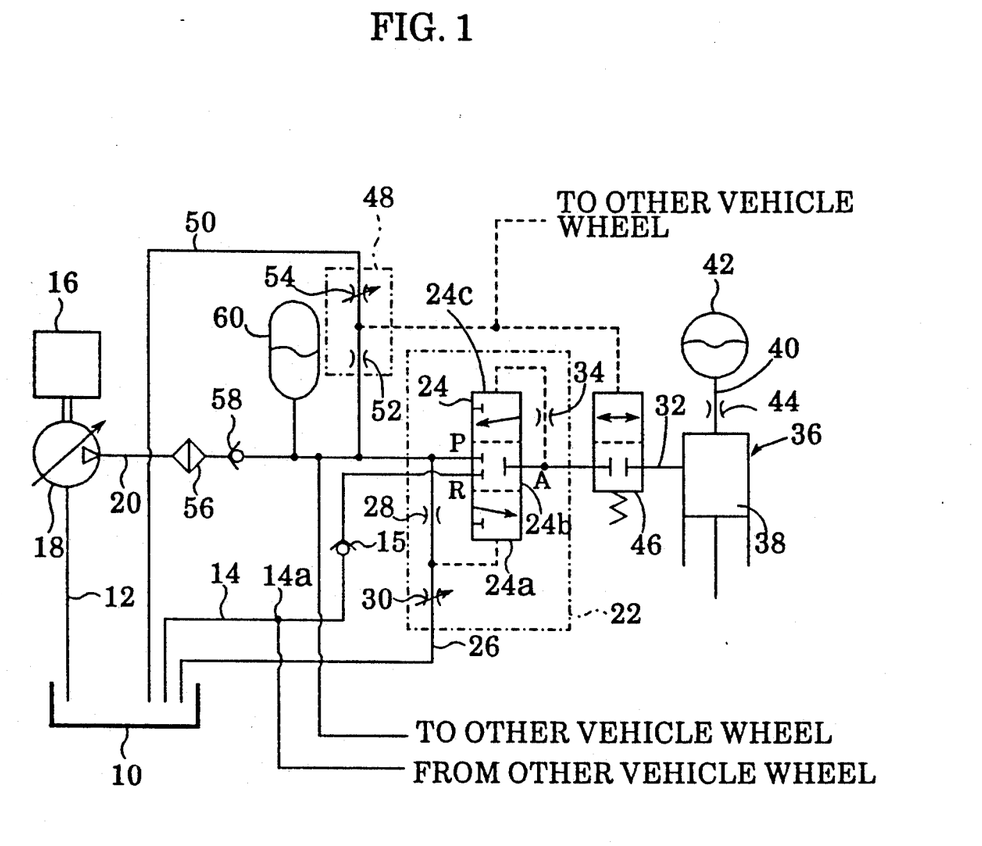
FIG. 1 is a diagrammatical construction view of a hydraulic circuit of an embodiment of the active suspension according to the present invention.

In FIG. 1, 10 designates a reservoir for storing oil operating as a working fluid. A connection passage 12 is connected to the reservoir 10 at one end thereof, and a working fluid exhaust passage 14 is also connected at one end thereof to the reservoir 10. The connection passage 12 is connected at another end thereof with an intake side of a pump 18 driven by an engine 16. In the shown embodiment, the pump 18 is a variable capacity pump, a delivery slide of which is connected with one end of a working fluid supply passage 20. Another end of the working fluid supply passage 20 and another end of the working fluid exhaust passage 14 are connected to port P and port R of a pilot operated three ports, three positions changeover control valve 24 of a pressure control valve 22, respectively. At a middle portion of the working fluid exhaust passage 14, on a side closer to the pressure control valve 22 than a connection point 14a with a working fluid exhaust passage from other vehicle wheel, there is provided a non-return valve 15 which allows a flow of the working fluid only in a direction flowing from the pressure control valve 22 toward the reservoir 10.

The pressure control valve 22 includes the changeover control valve 24, a connection passage 26 connecting the working fluid supply passage 20 with the reservoir 10, and a fixed throttle means 28 and a variable throttle means 30 provided in succession at a middle portion of the connection passage 26. A connection passage 32 is connected to port A of the changeover control valve 24. The changeover control valve 24 is a spool valve adapted to be operated by pilot pressures which are pressure Pp existing in the passage 26 at a portion between the fixed throttle means 28 and the variable throttle means 30 and pressure Pa existing in a connection passage 32. The changeover control valve 24 is changed over to a changeover position 24a to connect port P with port A when pressure Pp is higher than pressure Pa, to a changeover position 24b to interrupt connection between all the ports when pressure Pp is equal to pressure Pa, and to a changeover position 24c to connect port R with port A when pressure Pp is lower than pressure Pa. The variable throttle means 30 changes its effective passage area according to a control electric current supplied to its solenoid so as to change pressure Pp in cooperation with the fixed throttle means 28.

The connection passage 32 is connected at another end thereof with a working fluid chamber 38 of an actuator 36 provided to correspond to a vehicle wheel. As is shown in the figure, the actuator 36 is a kind of cylinder-piston means disposed between a suspension member for supporting a vehicle wheel and a vehicle body, both not shown in the figure, so that it increases or decreases the vehicle height at the corresponding position according to supply or exhaust of the working fluid to or from the working fluid chamber 38. A gas-liquid spring means 42 is connected to the working fluid chamber 38 via a passage 40. A throttle means 44 is provided at a middle portion of the passage 40. The gas-liquid spring means 42 operates as a suspension spring or an auxiliary suspension spring, wherein the throttle means 44 generates a damping force.

An on-off valve 46 is provided at a middle portion of the connection passage 32. The on-off valve 46 is constructed to be opened when a pilot pressure Pc supplied thereto from a pilot pressure control means 48 is higher than a predetermined valve opening pressure and to be closed when the pilot pressure is lower than a predetermined valve closing pressure. The pilot pressure control means 48 includes a connection passage 50 connecting the working fluid supply passage 20 and the reservoir 10, and a fixed throttle means 52 and a variable throttle means 54 provided in succession at a middle portion of the connection passage 50, wherein the pilot pressure Pc is provided as a pressure between the fixed throttle means and the variable throttle means.

A non return valve 58 is provided at a middle portion of the working fluid supply passage 20 so as to allow the working fluid to flow only from the pump 18 toward the pressure control valve 22 through a filter 56. Further, an accumulator 60 is connected to the working fluid supply passage 20 at the downstream side of the non-return valve 58.

It is to be noted that the non return valve 15, the pressure control valve 22, the connection passage 32, the throttle means 44, the on-off valve 46, the actuator 36, the gas-liquid spring means 42, etc. are each provided to correspond to each vehicle wheel. In this connection, in FIG. 2, the pressure control valves corresponding to front right, front left, rear right and rear left vehicle wheels are designated by 22fr, 22fl, 22rr and 22rl, respectively.

Figure 2:
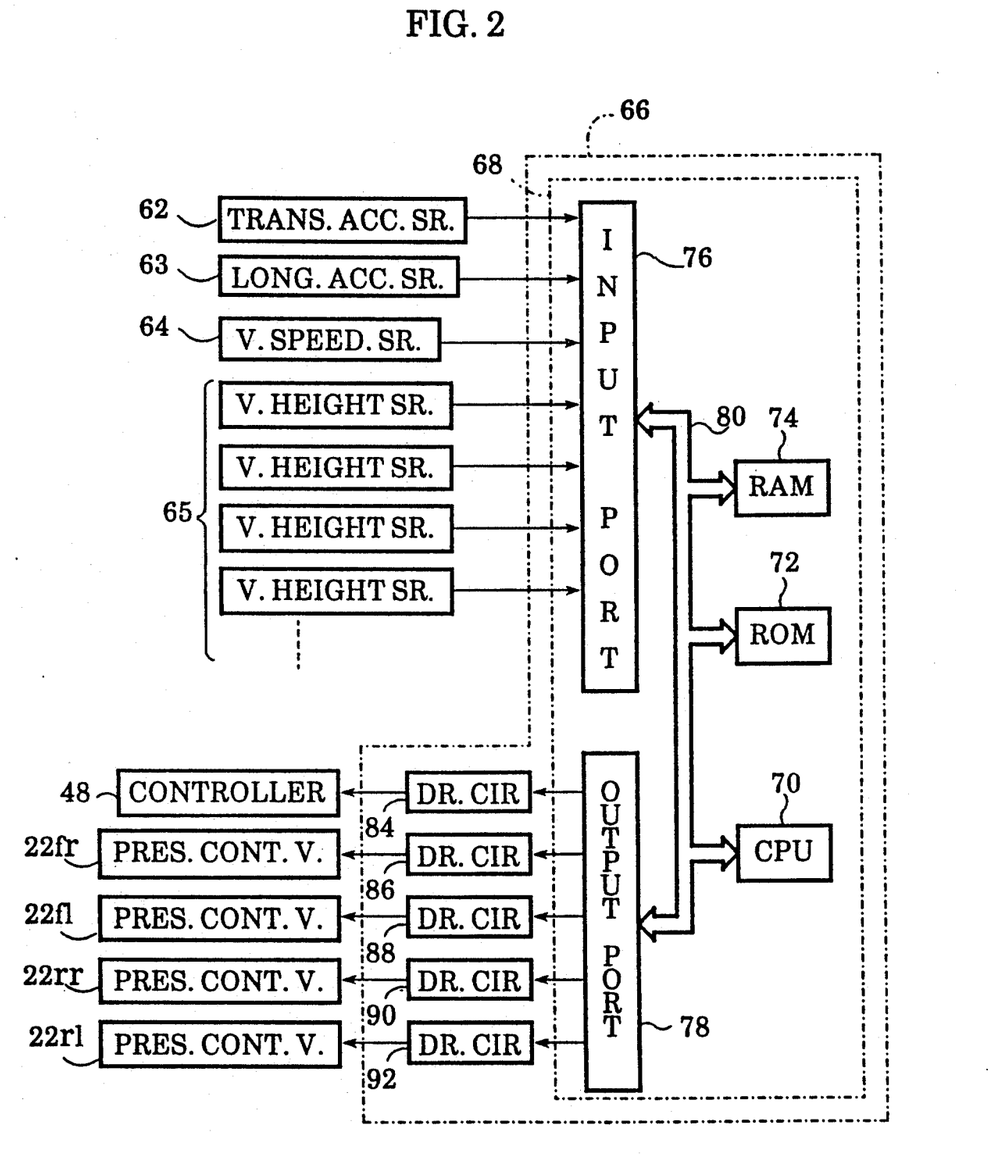
FIG. 2 is a block diagram showing an electric control means of the embodiment shown in FIG. 1.

The pressure control valve 22 is controlled by an electric control means 66 shown in FIG. 2. The electric control means 66 comprises a micro computer 68 which may have a common construction, as shown in FIG. 2, including a central processing unit (CPU) 70, a read only memory (ROM) 72, a random access memory (RAM) 74, an input port means 76, an output port means 78 and a common bus 80.

Figure 4:
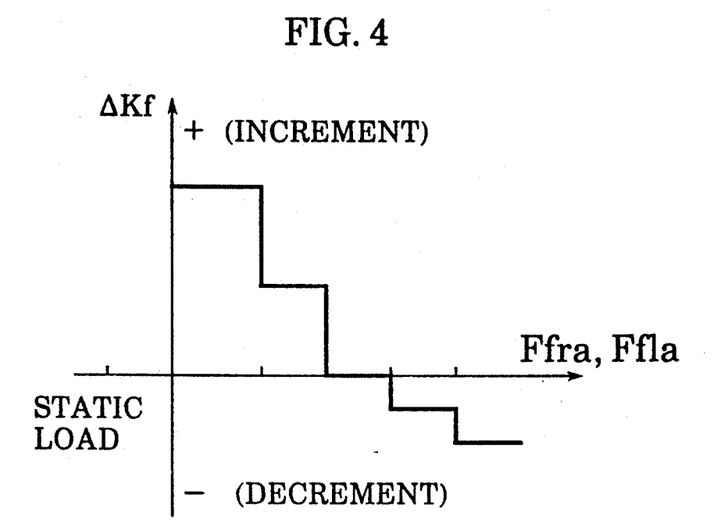
FIG. 4 is a graph showing the relation between the target loads Ffra and Ffla on the front vehicle wheels and the roll rigidity distribution ratio compensation amount delta Kf.
Figure 5:
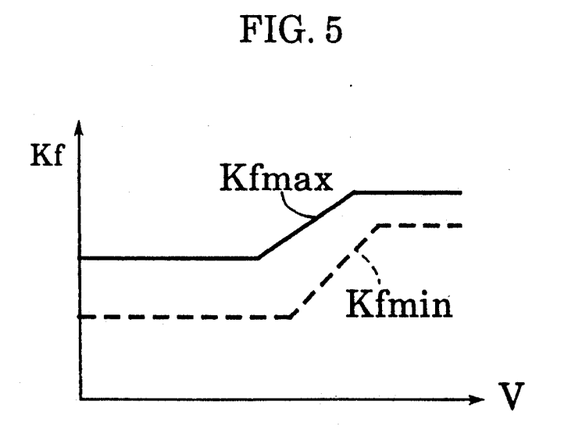
FIG. 5 is a graph showing the relation between vehicle speed V and the maximum value Kfmax and the minimum value Kfmin of the roll rigidity distribution ratio Kf.

The input port means 76 is inputted with a signal representing transverse acceleration Gx (positive when directed leftward) of a vehicle body from a transverse acceleration sensor 62, a signal representing longitudinal acceleration Gy (positive when directed forward) of the vehicle body from a longitudinal acceleration sensor 62, a signal representing vehicle speed V from a vehicle speed sensor 64, signals representing vehicle heights corresponding to respective vehicle wheels from vehicle wheel sensors 65 and others signals concerned with the running condition of the vehicle. The input port means 76 processes these input signals appropriately and supplies the processed signals to CPU 70 and RAM 74 according to the instructions from CPU 70 based upon a program stored in ROM 72. ROM 72 stores such a control program, such maps as shown in FIGS. 4 and 5, and so on. CPU 70 makes various calculations and signal processing such as described hereinunder according to the flow of signals shown in FIG. 3 to control the rolling and the pitching of the vehicle body. The output port means 78 outputs control signals toward the variable throttle means 54 of the pilot pressure control means 48 through a driving circuit 84 and to the pressure control valves 22fr, 22fl, 22rr and 22rl through driving circuits 86-92, respectively, according to the instructions from CPU 70.

The control operation of the electric control means 66 is started at a closure of an ignition switch (not shown in the figure), and is ended after the lapse of a short time from the opening of the ignition switch. When the operation of the active suspension is started, the pilot pressure control means 48 is operated to gradually increase the pilot pressure Pc, whereby the on-off valve 46 is gradually opened toward its fully opened condition. Further details of such a control, if desired, are described in the specification of Japanese Patent Application 2-199883 filed by the same applicant as the present application.

Next, the operation of the shown embodiment will be described with reference to the signal flowchart of FIG. 3 and the maps of FIGS. 4 and 5.

Figure 3:
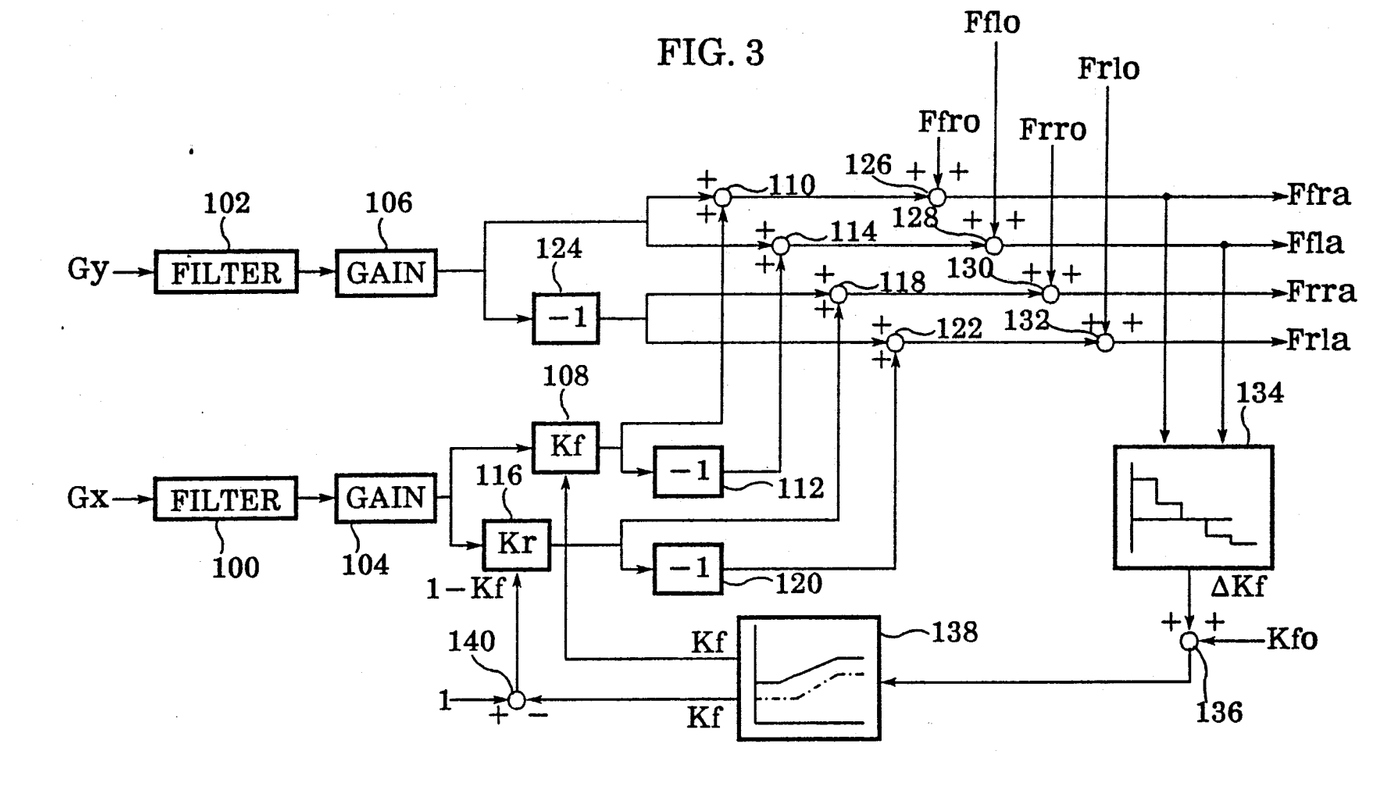
FIG. 3 is a signal flowchart showing calculations and signal processing carried out by the electric control means shown in FIG. 2.

Referring to FIG. 3, the transverse acceleration Gx and the longitudinal acceleration Gy of the vehicle detected by the transverse acceleration sensor 62 and the longitudinal acceleration sensor 63, respectively, are passed through low pass filters 100 and 102, respectively, so that high frequency components are removed therefrom, and are then multiplied by predetermined tuning gains at factor multipliers 104 and 106, respectively.

The transverse acceleration multiplied by the tuning gain is further multiplied by a front vehicle wheel roll rigidity distribution factor Kf (greater than 0 and less than 1) at a factor multiplier 108, the output of which is inputted to an adder 110 and also to an adder 114 with its sign having been converted through a sign converter 112. The transverse acceleration multiplied by the tuning gain is also multiplied by a rear vehicle wheel roll rigidity distribution factor Kr ($=1-Kf$) at a factor multiplier 116, the output of which is inputted to an adder 118 and also to an adder 122 with its sign having been converted through a sign converter 120.

On the other hand, the longitudinal acceleration multiplied by the tuning gain is inputted to the adders 110 and 114 and also to the adders 118 and 122 with its sign having been converted through a sign converter 124.

The outputs of the adders 110, 114, 118 and 122 are added with static loads Ffro, Fflo, Frro and Frlo of the front right vehicle wheel, front left vehicle wheel, rear right vehicle wheel and rear left vehicle wheel at adders 126-132, respectively. Thus, target loads Ffra, Ffla, Frra and Frla for the front right, front left, rear right and rear left vehicle wheels are outputted from the adders 126-132, respectively.

The output Ffra of the adder 126 and the output Ffla of the adder 128 are inputted to a front vehicle wheel roll rigidity distribution ratio compensation amount calculator 134. The calculator 134 calculates a front vehicle wheel roll rigidity distribution ratio compensation amount, ΔKf, based upon a greater one of the target loads Ffra and Ffla according to a map such as shown in FIG. 4. The calculated compensation amount is inputted to an adder 136, wherein the compensation amount is added with a predetermined standard value Kfo of the front vehicle wheel roll rigidity distribution ratio to provide an output which is supplied to a comparison calculator 138.

The calculator 138 judges whether or not the sum Kfo+ΔKf inputted from the adder 136 is between such a maximum value Kfmax and such a minimum value Kfmin of the front vehicle wheel roll rigidity distribution ratio as set out in a map shown in FIG. 5, and if the sum is between these maximum and minimum values, it outputs the value with no modification, whereas if the sum is larger than the maximum value or smaller than the minimum value, it outputs the maximum value or the minimum value, respectively.

The output of the calculator 138 is supplied to the factor multiplier 108 to provide the front vehicle wheel roll rigidity distribution factor Kf, and is also supplied to a subtraction terminal of an adder 140 having an addition terminal supplied with 1, so that 1−Kf outputted from the adder 140 is supplied to the factor multiplier 116 to provide the rear vehicle wheel roll rigidity distribution ratio Kr.

It is to be noted that the target pressures for the working fluid chambers of the respective actuators for controlling the attitude of the vehicle body and the riding comfortableness of the vehicle according to the running conditions of the vehicle and the control electric currents supplied to the solenoids of the variable throttle means of the pressure control valves 22fr, 22fl, 22rr and 22rl to accomplish such target pressures may be calculated according to a feed forward control based upon the acceleration of the vehicle body, a feed back control based upon the vehicle height, etc. However, such an active calculation itself does not form the gist of the present invention, and may be appropriately adopted so as to decrease or obviate the rolling of the vehicle body, as long as the pressure control valves are controlled according to the transverse and longitudinal accelerations, as, for example, described in Japanese Patent Laid-open Publication 2-175405 based upon an application filed by the same applicant as the present application.

Figure 6:
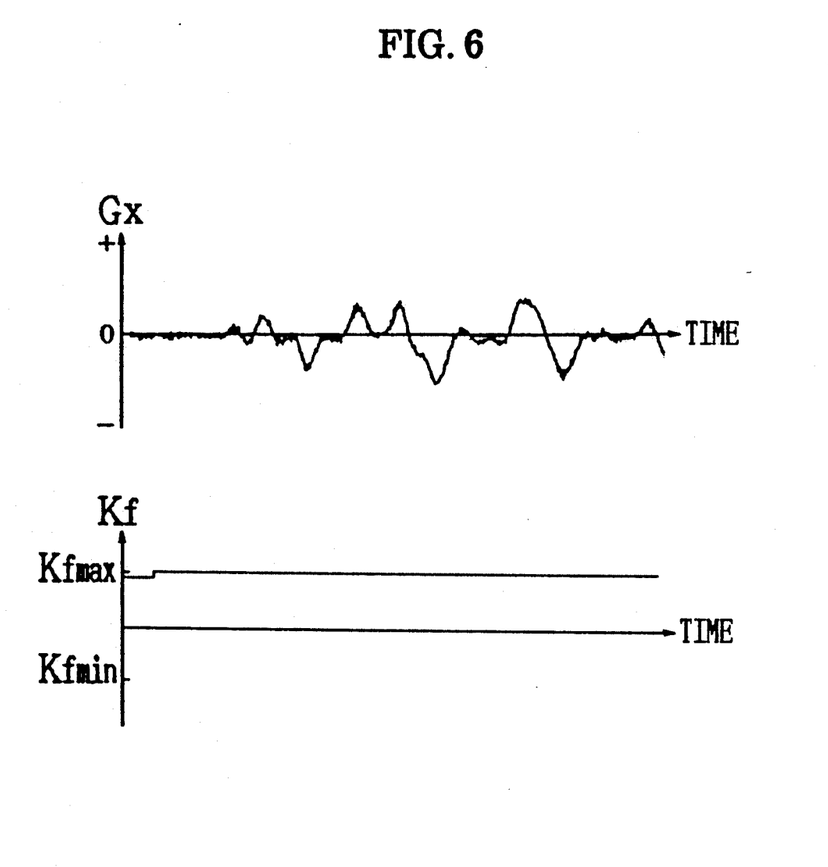
FIG. 6 is a graph showing changes of the transverse acceleration Gx and the roll rigidity distribution ratio Kf in the shown embodiment during a lane change of the vehicle under a normal condition.

According to the shown embodiment, as shown in FIG. 6, when the vehicle turns at a normal low transverse acceleration as in a lane change, as the target loads Ffra and Ffla for the front vehicle wheels are relatively low, the roll rigidity distribution ratio compensation amount ΔKf is relatively large, and therefore the roll rigidity distribution ratio ΔKf remains almost fixedly at the maximum value Kfmax. Therefore, the steering performance is shifted toward the understeer, so that the stability of the vehicle is ensured.

Figure 7:
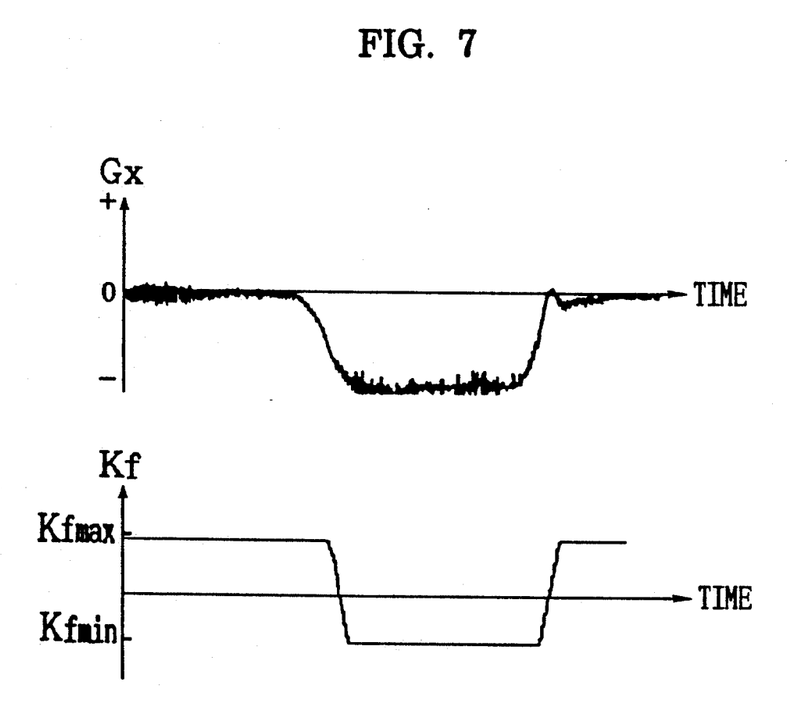
FIG. 7 is a graph showing changes of the transverse acceleration Gx and the roll rigidity distribution ratio Kf in the shown embodiment during a high transverse acceleration turn of the vehicle.

When the vehicle turns at a high transverse acceleration close to a maximum allowable transverse acceleration, the target loads Ffra and Ffla at the front vehicle wheels are relatively high, so that the roll rigidity distribution ratio compensation amount ΔKf becomes negative, and therefore the roll rigidity distribution ratio Kf is maintained almost fixedly at the minimum value Kfmin determined according to the vehicle speed V (FIG. 7). Therefore, the steering performance is shifted toward the oversteer, so as thereby to ensure the manoeuvrability of the vehicle.

Figure 8:
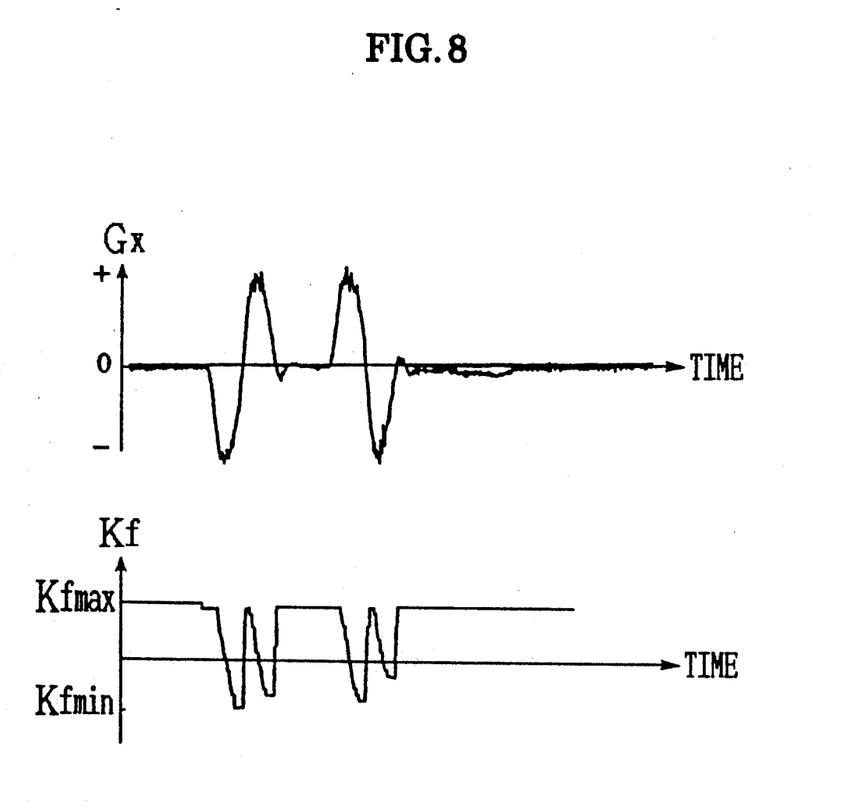
FIG. 8 is a graph showing changes of the transverse acceleration Gx and the roll rigidity distribution ratio Kf in the shown embodiment during a lane change of the vehicle under a severe condition.

Referring to FIG. 8, when the vehicle makes a lane change at a high transverse acceleration, as the target loads Ffra and Ffla for the front vehicle wheels change alternately between a relatively high value and a relatively low value, the roll rigidity distribution ratio compensation amount ΔKf changes alternately between a relatively high positive value and a negative value, and therefore the roll rigidity distribution ratio Kf changes between the maximum value Kfmax and the minimum value Kfmin determined based upon the current vehicle speed V, whereby both the stability and the manoeuvrability are ensured.

Particularly in the shown embodiment, since, in the map shown in FIG. 4, the absolute values of the increments are set to be greater than those of the decrements, the roll rigidity distribution ratio Kf is swiftly returned to the maximum value Kfmax at the end of the turning, as shown in FIG. 8, whereby the stability of the vehicle is further improved.

As is apparent from the foregoing descriptions, according to the present invention, during a high transverse acceleration turning the roll rigidity distribution is shifted toward the rear vehicle wheels, so that the steering performance is shifted toward the oversteer, and therefore a good manoeuvrability is ensured, while during a normal turning including a lane change the roll rigidity distribution is shifted toward the front vehicle wheels, so that the steering performance is shifted toward the understeer, and therefore a good stability of the vehicle is ensured.

It is to be noted that, although in the shown embodiment the load on the vehicle wheel at the outside of the turning is presumed from the sum of the target load, i.e. the feed forward control amount based upon the acceleration of the vehicle body and the static load on each vehicle wheel, it may be calculated from a multiplication of the pressure in the working fluid chamber of the actuator detected by a sensor and the pressure receiving area of the piston, or it may be presumed from a calculation based upon the transverse acceleration detected by the transverse acceleration sensor.

Further, although in the shown embodiment the means to control the pressure in the working fluid chamber of each actuator is a pressure control valve, it may be a flow control valve.

Although the present invention has been described in the above with respect to a particular embodiment thereof, it will be apparent to those of ordinary skill in the art that various other embodiments are possible within the scope of the present invention.

We claim:

1. An active suspension comprising a plurality of actuators such that a corresponding one of said actuators is provided to each vehicle wheel so as to support a corresponding part of vehicle load according to a target load value determined therefor, a transverse acceleration detection means for detecting transverse acceleration of a vehicle body, a means for dividing said vehicle load to be imposed on each vehicle wheel based upon the transverse acceleration detected by said transverse acceleration detection means through adjustment of said target load values, and a control means for controlling each of said plurality of actuators in accordance with said target load value therefor, wherein said vehicle load dividing means is adapted to provide a greater share of the vehicle load due to the transverse acceleration to be born on a rear vehicle wheel as said target load value on a front vehicle wheel at the outside of the turn increases.

2. An active suspension according to claim 1, wherein said vehicle load dividing means comprises a first factor multiplier for the front vehicle wheels and a second factor multiplier for the rear vehicle wheels, said first and second factor multipliers calculating loads imposed on the front and rear vehicle wheels due to the transverse acceleration based upon first and second multiplication factors, respectively, and a function generating system for generating said first and second multiplication factors based upon at least one of the loads on the front vehicle wheels, wherein said function generating system decreases said first multiplication factor for the front vehicle wheels relative to said second multiplication factor for the rear vehicle wheels as the load on at least one of the front vehicle wheels increases.

3. An active suspension according to claim 2, wherein said function generating system comprises a means for restricting said first and second multiplication factors not to be greater than maximum values predetermined therefor and not to be less than minimum values predetermined therefor.

4. An active suspension according to claim 3, wherein said maximum and minimum values for said first and second multiplication factors are increased when vehicle speed increases.

5. An active suspension according to claim 1, wherein each of said actuators is a hydraulic actuator having a working fluid chamber, and said control means comprises a hydraulic circuit means for supplying and exhausting a working fluid to and from each of said working fluid chambers, and an electric control means for controlling flow of the working fluid in said hydraulic circuit means.

* * * * *